No. 784,927.

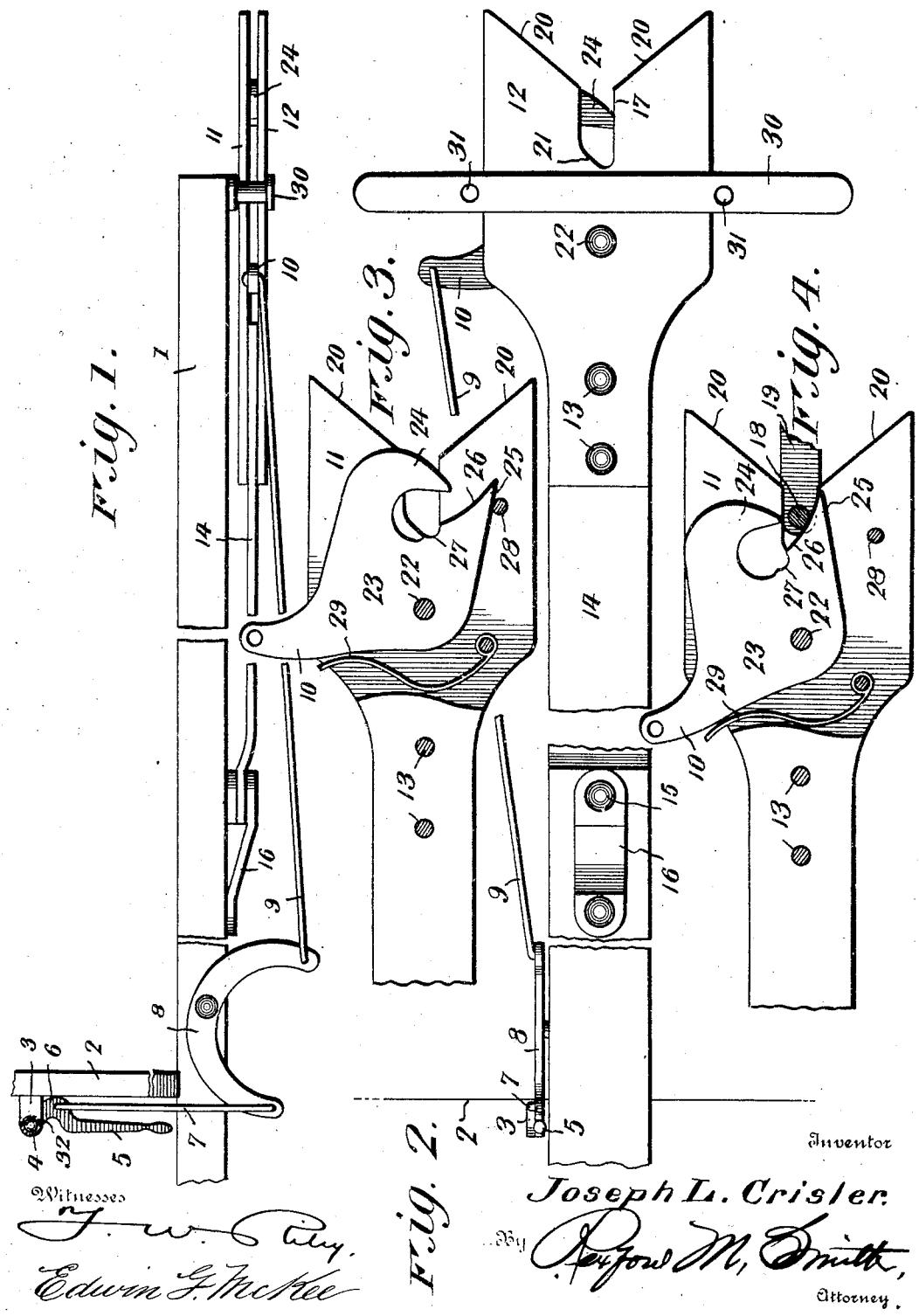

Patented March 14, 1905.

UNITED STATES PATENT OFFICE.

JOSEPH L. CRISLER, OF PERTH, KANSAS.

COUPLING.

SPECIFICATION forming part of Letters Patent No. 784,927, dated March 14, 1905.

Application filed February 1, 1904. Serial No. 191,595.

*To all whom it may concern:*

Be it known that I, JOSEPH L. CRISLER, a citizen of the United States, residing at Perth, in the county of Sumner and State of Kansas, have invented a certain new and useful Coupler, of which the following is a specification, reference being had therein to the accompanying drawings.

This invention relates to couplers, especially adapted for connecting together traction-engines, tenders therefor, and threshing-machines or other agricultural machinery for the purpose of carrying the same from place to place, the object of the invention being to provide an automatic coupler which will enable machines of the character referred to to be coupled quickly without the necessity of the operator going between the machines as they are brought together.

A further object of the invention is to so construct the coupler and the operative parts thereof that the coupling device proper is automatically locked, thereby preventing accidental release and disengagement.

The invention also has for its object to provide means for setting and releasing the coupler, the same being within easy reach and control of the operator while standing on the engine or tender or other machine to which the coupler is applied.

With the above and other objects in view the invention consists in the novel construction, combination, and arrangement of parts, as hereinafter fully described, illustrated, and claimed.

In the accompanying drawings, Figure 1 is a side elevation of a sufficient portion of an engine or tender to illustrate the application of the improved coupler thereto, the coupler and the operating mechanism therefor being also shown in elevation. Fig. 2 is a bottom plan view of the same. Fig. 3 is a plan view of the coupler with the upper plate removed to show the hook and its relation to the throat of the draw-head, the hook being shown closed or in its operative position. Fig. 4 is a similar view showing the coupling-hook thrown open and being acted upon by the coupling-pin as the latter enters the throat of the draw-head.

Like reference-numerals designate corresponding parts in all the figures of the drawings.

Referring to the drawings, 1 designates the reach-bar or tongue or other portion of the running-gear or truck of an engine, tender, threshing-machine or other agricultural machine, while 2 represents an upstanding portion of the machine to which is applied a bracket 3, having pivotally connected therewith at 4 one end of an uncoupling-lever 5, which is provided intermediate its ends and near its fulcrum with an offset 6, to which is attached one end of a connecting-rod 7, the opposite end of which connects with one end of a bell-crank lever 8, fulcrumed on the machine-frame and having attached to its opposite end another connecting-rod, 9, which extends lengthwise of the machine and pivotally connects with a laterally-extending lever-arm 10 on the coupling-hook, hereinafter particularly described, the connections hereinabove referred to being adapted for the purpose of setting and releasing the coupler, as will appear from the following description.

The coupler embodies a draw-head which is composed of upper and lower plates 11 and 12, respectively, the rear ends of said plates being bolted, riveted, or otherwise secured, as shown at 13, to a shank-boss or draw-bar 14, one end of which is held between the plates 11 and 12, while the opposite end is connected pivotally by means of a bolt or its equivalent 15 to the frame 1, the bolt being held and strengthened by means of a brace 16, as shown.

The end portions of the plates 11 and 12 are widened to form a draw-head, and the extreme portion thereof is provided with a central throat 17, adapted to receive the coupling-pin 18, connected, by means of a tongue or bar 19, with the tender or agricultural implement which is to be coupled up with the engine or other machine which carries the coupler. The outer edge portion of the draw-head and the plates 11 and 12, which form the draw-head, is reversely beveled at opposite sides of the entrance-throat, as shown at 20, in order to properly guide the coupling-pin into the throat 17. The throat 17 may be of any desired depth or length; but in carrying out the present invention the inner end of the throat is beveled or made slanting, as shown at 21, so that as the coupling-pin 18 moves rearward along the throat 17 the said pin will be crowded to one side of the throat, or, in other words, into the contracted rear end of said throat.

Mounted between the plates 11 and 12 on a pivot 22 is a coupling-hook 23, which is provided with a bill 24, which normally extends across the throat 17, as shown in Figs. 2 and 3, the inner edge of the bill 24 extending substantially straight across the throat 17, so that when pulling-strain is applied to the coupler there will be no tendency to throw the hook open, the tendency being rather to hold the hook in its closed position. Just opposite the point of the bill 24 the coupling-hook is provided with a pointed tongue 25, which extends beyond the bill 24 and is provided with a slanting face 26, which lies exactly opposite the point of the bill 24 and forms an inclined shoulder against which the coupling-pin 18 rides as it moves inward along the throat 17 in the manner illustrated in Fig. 4.

At the inner end of the inclined shoulder or slanting face 26 is what I term a "lock-notch" 27, and by reference to Fig. 3 it will be observed that said lock-notch when the hook is closed registers with the contracted inner end of the throat 17. Thus the coupling-pin 18 simultaneously rests in the contracted inner end of the throat 17 and in the lock-notch 27, thus holding the coupling-hook 23 locked and obviating any tendency to throw the coupling-hook open.

28 designates a stop for limiting the closing movement of the hook, while 29 represents a closing-spring which yieldingly acts upon the lever-arm 10 to hold the hook closed and to throw the same to its closed position when the coupling-lever is released.

The draw-head is embraced on its upper and lower sides by means of parallel bars 30, which forms a supporting-guide, the same being connected to the frame 1 and being long enough to allow the draw-head to play from side to side in the act of coupling machines together. In order to keep the draw-head in the center of the machine after coupling has been effected, the bars 30 are provided with vertically-alined openings 31 to receive detachable pins which may be dropped into said openings and which will thus serve to prevent any excessive lateral movement of the draw-head and maintain the same in the center of the machine after the coupling has been effected. Frequently in coupling machines together it is difficult to bring the same exactly in line with each other, so that it is found convenient to be able to swing the coupler to one side or the other for facilitating the coupling operation. After this is accomplished the pins may be inserted in the openings 31 to hold the couplers in alinement.

By reference to Fig. 1 it will be observed that as the parts are therein shown the uncoupling-lever 5 is held locked by reason of the fact that the pushing strain on the connecting-rod 7 is applied to said lever between the line of the pivot 4 and the upright piece 2 of the frame, which piece serves as a stop for the lever. The lever being thus held locked, the coupling-hook 23 is also held locked through the medium of the interposed connections. Therefore in order to unlock the coupler the operator swings the lever 5 upward, which has the effect of vibrating the coupling-hook 23 on its pivot, thus withdrawing the bill of the hook from across the throat 17, after which the coupling-pin 18 may be withdrawn.

The lever 5 when swung upward is adapted to be held at any point where it is left by means of a spring-washer 32, which is interposed between a portion of the bracket 3 and the lever, as shown. In this way the coupling-hook 23 is held open in the position shown in Fig. 4 ready to receive the coupling-pin 18. As the latter is thrust inward along the throat 17 it acts on the slanting face 26 of the hook and automatically swings the hook until the bill 24 is carried across the entrance-throat behind the coupling-pin. Simultaneously with this movement the operating connections are moved so that the uncoupling-lever 5 is swung downward to the position shown in Fig. 1, whereupon it automatically locks itself and all of the other connections which intervene between said lever and the coupling-hook 23, the spring 29 assisting in the closing of the hook and the working of the connections between the hook and the uncoupling-lever.

Having thus described the invention, what is claimed as new is—

1. A coupler embodying a draw-head provided with an entrance-throat having a slanting and contracted rear portion, and a coupling-hook pivotally mounted in the draw-head and provided with a bill extending across the throat and also having a slanting shoulder which lies opposite the bill and inclines reversely to the inclination of the rear end of the throat, substantially as and for the purpose described.

2. A coupler embodying a draw-head having an entrance-throat with an obliquely-disposed and gradually-contracting inner end, and a coupling-hook pivotally mounted in the draw-head and provided with a bill extending across the entrance-throat, and also having a tongue provided with a slanting face which lies opposite the bill and which inclines reversely to the inclination of the rear end of the throat and which extends across the throat when the hook is open so as to receive the impact of the coupling-pin, substantially as described.

3. A coupler comprising a draw-head, having an entrance-throat, and a coupling-hook pivotally mounted therein, the entrance-throat and hook having reversely-inclined faces against which the coupling-pin simultaneously acts as it moves along the throat, and the coupling-hook being provided with a lock-notch which registers with the contracted rear end of the entrance-throat, substantially as described.

4. A coupler comprising a draw-head having an entrance-throat, a spring-closed coupling-hook having a bill which extends across the throat, the hook and throat having reversely-inclined faces against which the coupling-pin simultaneously acts for closing the coupling-hook to retain the coupling-pin, and means for opening the coupling-hook to release the coupling-pin, substantially as described.

5. A coupler embodying a draw-head having an entrance-throat, a spring-closed coupling-hook having a bill which projects across the entrance-throat, a self-locking uncoupling-lever, and connections interposed between the said uncoupling-lever and the coupling-hook, the arrangement being such that when the hook is moved to its closed position, the uncoupling-lever is thrown to a position in which it locks itself and also locks the coupling-hook, substantially as described.

In testimony whereof I affix my signature in presence of two witnesses.

JOSEPH L. CRISLER.

Witnesses:
E. B. WIMER,
E. M. CARR.